United States Patent
Stark et al.

(10) Patent No.: US 11,899,438 B1
(45) Date of Patent: Feb. 13, 2024

(54) DISTRIBUTED CONTROL SYSTEM WITH FAILOVER CAPABILITIES FOR PHYSICAL WELL EQUIPMENT

(71) Applicant: Halliburton Energy Services, Inc., Houston, TX (US)

(72) Inventors: Daniel Joshua Stark, Houston, TX (US); Etienne Samson, McKinney, TX (US); Adan H. Herrera, Carrollton, TX (US); Allan Silva Freitas, Divinopolis (BR); Dale E. Jamison, Humble, TX (US); Adam Harold Martin, Addison, TX (US); Alexander Simon Chretien, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/082,217

(22) Filed: Dec. 15, 2022

(51) Int. Cl.
*G05B 23/02* (2006.01)
*G01V 1/44* (2006.01)

(52) U.S. Cl.
CPC .......... *G05B 23/0262* (2013.01); *G01V 1/44* (2013.01)

(58) Field of Classification Search
None
See application file for complete search history.

(56) References Cited

U.S. PATENT DOCUMENTS

| | | |
|---|---|---|
| 2004/0093516 A1 | 5/2004 | Hornbeek et al. |
| 2005/0218841 A1 | 10/2005 | Marks et al. |
| 2007/0156253 A1* | 7/2007 | De Silvio ............ G05B 19/056 700/6 |
| 2007/0270984 A1* | 11/2007 | Lobig ................. H04L 41/0668 714/E11.207 |
| 2009/0222687 A1* | 9/2009 | Baker ................. H04L 41/0681 714/4.11 |

(Continued)

FOREIGN PATENT DOCUMENTS

| | | |
|---|---|---|
| EP | 2416464 A2 | 2/2012 |
| WO | 9836335 A2 | 8/1998 |

(Continued)

OTHER PUBLICATIONS

International Search Report and Written Opinion, PCT/US2023/031129, dated Dec. 7, 2023, 11 pages.

*Primary Examiner* — Bernard G Lindsay
(74) *Attorney, Agent, or Firm* — Kilpatrick Townsend & Stockton LLP

(57) ABSTRACT

A distributed control system can be used to implement failover capabilities for control units that control well equipment during a well operation. For example, a system can include first well equipment that performs a first physical task and second well equipment that performs a second physical task different from the first physical task. Additionally, the system can include a distributed control system with a first control unit coupled to the first well equipment and a second control unit coupled to the second well equipment. Both control units may include a first control module and a second control module for automatically controlling the first physical task and the second physical task, respectively. The distributed control system can detect a failure of the second control unit and initiate a failover process in which the first control unit takes over control of the second physical task by enabling the second control module.

20 Claims, 6 Drawing Sheets

(56) References Cited

U.S. PATENT DOCUMENTS

| | | | |
|---|---|---|---|
| 2015/0192936 A1* | 7/2015 | Kelly | G06F 1/206 |
| | | | 700/90 |
| 2015/0293779 A1* | 10/2015 | Gamer | G06F 11/2033 |
| | | | 718/108 |
| 2020/0208510 A1* | 7/2020 | Guijt | E21B 47/26 |
| 2020/0327423 A1 | 10/2020 | Zheng et al. | |
| 2021/0062619 A1 | 3/2021 | Camacho Cardenas et al. | |
| 2022/0381120 A1 | 12/2022 | Nimbalkar et al. | |
| 2022/0404788 A1* | 12/2022 | Amaro, Jr. | G05B 19/41845 |

FOREIGN PATENT DOCUMENTS

| | | |
|---|---|---|
| WO | 2008022106 A1 | 2/2008 |
| WO | 2017059152 A1 | 4/2017 |
| WO | 2020131702 A1 | 6/2020 |
| WO | 2021184614 A1 | 9/2021 |

\* cited by examiner

US 11,899,438 B1

DISTRIBUTED CONTROL SYSTEM WITH FAILOVER CAPABILITIES FOR PHYSICAL WELL EQUIPMENT

TECHNICAL FIELD

The present disclosure relates generally to wellbore operations and, more particularly (although not necessarily exclusively), to a distributed control system with failover capabilities for physical well equipment.

BACKGROUND

A wellbore can be formed in a subterranean formation at a wellsite for extracting produced hydrocarbon or other suitable material. A wellbore operation, such as a drilling operation, can be performed at the wellsite to extract the produced hydrocarbon material or perform other suitable tasks relating to the wellbore. Some wellsites may have a centralized control system that can oversee the well equipment during the wellbore operation. But the centralized control system can fail or encounter connection issues, causing problems in the wellbore operation. For example, a power outage can cause the centralized control system to fail, thereby halting the wellbore operation until manual control can be implemented.

DETAILED DESCRIPTION

Figure 1:
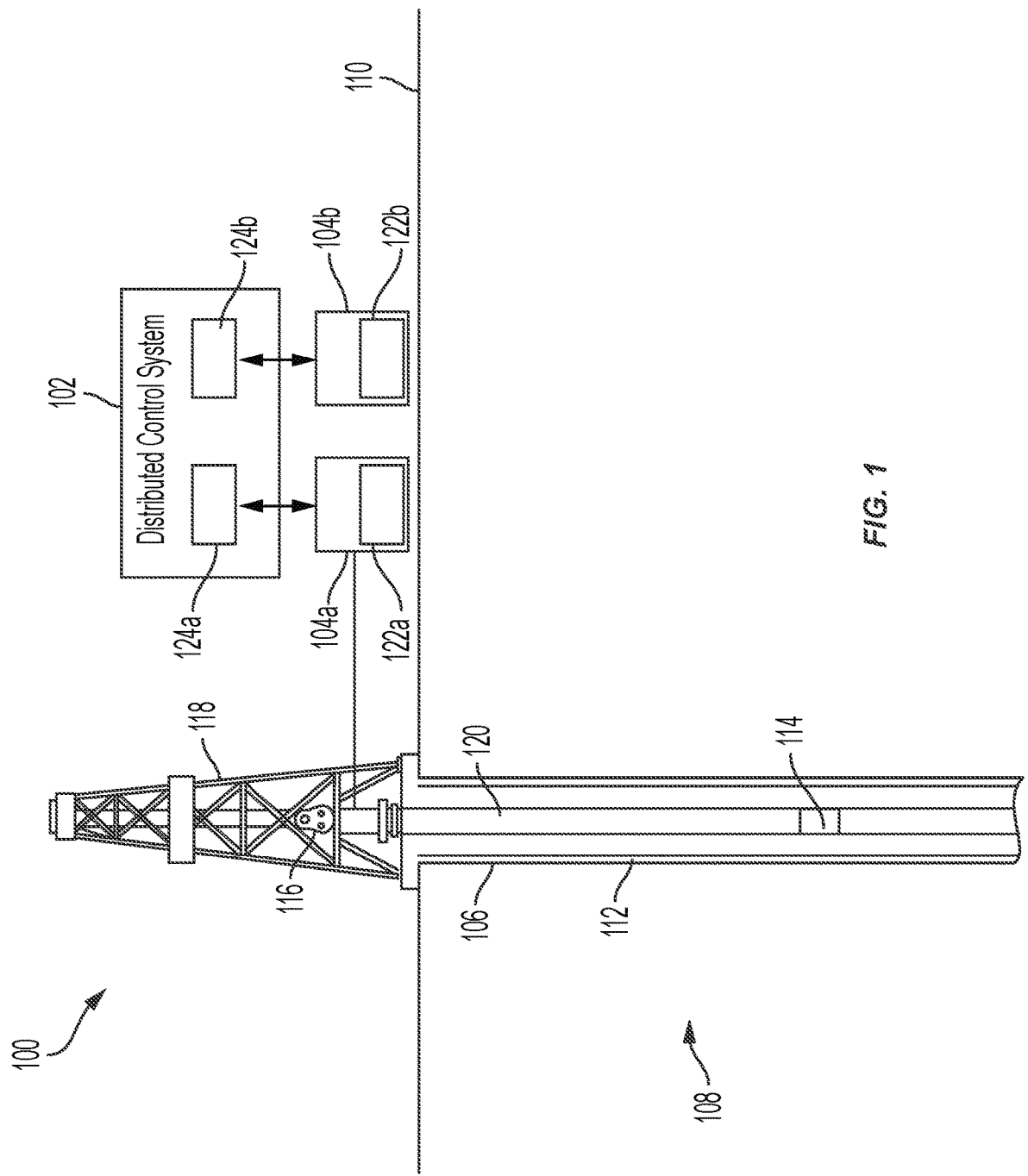
FIG. 1 is an example of a wellsite that includes a distributed control system with failover capabilities for physical well equipment according to some aspects of the present disclosure.

Certain aspects and features of the present disclosure relate to a distributed control system with failover capabilities for physical well equipment. The distributed control system can include control units that are loosely coupled and can function independently from each other. The control units can control a wellbore operation at a wellsite, which can include multiple pieces of physical well equipment positioned near or inside a wellbore that is formed through a subterranean formation. As used herein, a piece of well equipment can be hardware that is primarily designed to perform at least one physical task (e.g., pumping, storage of liquids or solids, or well testing) at the wellsite. As one example, the distributed control system can include a first control unit coupled to a first piece of well equipment and a second control unit coupled to a second piece of well equipment. The first piece of well equipment can be configured to perform a first physical task associated with a wellbore operation, and the second piece of well equipment can be configured to perform a second physical task associated with the wellbore operation. The first control unit and the second control unit can both include a first control module that automatically controls the first physical task and a second control module that automatically controls the second physical task. The distributed control system can detect a failure of the second control unit and, in response, can automatically initiate a failover process through which the first control unit takes over control of the second physical task. Using these techniques, a network of distributed control units can be established at the wellsite to enable the failover capabilities for the physical well equipment. The network of distributed control units can provide redundancy in controlling the physical well equipment, for example to hand over control of a physical task to a different control unit or to regain control over the physical task after handing over the control.

In some cases, a disconnection or an inoperative control unit can be costly in terms of man-hours or operation downtime. For example, the inoperative control unit may result in manual operation of a corresponding piece of well equipment, causing one or more personnel to be present onsite to operate the corresponding piece of well equipment. By enabling the failover capabilities, downtime or manual operation of a piece of well equipment can be minimized. For example, the distributed control system can enable the control units to interact with one another such that a functional control unit can take over control of the physical task corresponding to the inoperative control unit. This interaction may enable each control unit to determine a respective set point or a respective workflow to implement based on input from other control units.

In some examples, the distributed control system can allow the pieces of well equipment to interact with one another to make more informed and intelligent decisions about their own operation as well as the overall progress of the well operation. For instance, each piece of well equipment can transmit their status, sensed parameters, and other information to other pieces of well equipment, which can take that information into account to make more informed decisions about how to adjust its settings. Sharing such information can allow each piece of well equipment to implement actions that contribute to the overall progress of the well operation. In some examples, a first control unit coupled to a first piece of well equipment can mitigate a hazard for a second piece of well equipment, for example based on communication from a second control unit coupled to the second piece of well equipment. For instance, the second control unit may transmit information indicative of the hazard to the first piece of well equipment. Based on this information, the first control unit can automatically adjust settings of the first piece of well equipment to avoid or mitigate the hazard. This may be helpful in situations where the second piece of well equipment cannot avoid or mitigate the hazard by adjusting its own settings. In this way, the two control units can work together to avoid or mitigate a hazard that may otherwise be unavoidable by an individual control unit.

As noted above, the control units can share information to make more informed decisions that can contribute to the overall progress of the well operation, which may otherwise be difficult for an individual control unit to do by itself. As one example, the first piece of well equipment can be a choke valve located at the wellsite. The first control unit can select a first action using a first data set corresponding to the choke valve. Similarly, the second piece of well equipment can be a tester valve that is also located at the wellsite. The second control unit can collect a second data set corresponding to the tester valve that affects whether or how the choke valve performs the first action. The two control units can share their respective information, which can allow them to develop a system solution that optimizes performance of the first action. For example, the second control unit can communicate the second data set corresponding to the tester valve to the first control unit, so that the first control unit can use both the first data set and the second data set to generate a system solution that considers data from associated with both pieces of well equipment. The control units can interact with each other in real time or in bursts to deliver data as needed.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is an example of a wellsite 100 that includes a distributed control system 102 with failover capabilities for physical well equipment 104 according to some aspects of the present disclosure. As depicted in FIG. 1, the wellsite 100 includes a wellbore 106 drilled through a subterranean formation 108. The wellbore 106 extends from a well surface 110 into strata of the subterranean formation 108. The strata can include different materials (e.g., rock, soil, oil, water, or gas) and can vary in thickness and shape. In some examples, the wellsite 100 may include more than one wellbore 106. Additionally, the wellbore 106 can be vertical as depicted, deviated, horizontal, or any combination of these.

The wellbore 106 can be cased, open-hole, or a combination of these. For example, a casing string 112 can extend from the well surface 110 through the subterranean formation 108. The casing string 112 may provide a conduit through which formation fluids, such as production fluids produced from the subterranean formation 108, can travel from the wellbore 106 to the well surface 110. In some examples, the casing string 112 can be coupled to the walls of the wellbore 106 via cement. For example, a cement sheath can be positioned or formed between the casing string 112 and walls of the wellbore 106 for coupling the casing string 112 to the wellbore 106.

The wellbore 106 additionally can include one or more well tools, such as well tool 114. In the example shown in FIG. 1, the well tool 114 is positioned in the wellbore 106 by a winch 116 in a derrick 118 positioned above the well surface 110. But in other examples, the well tool 114 may be positioned in the wellbore 106 in another manner. The well tool 114 can be coupled to a wireline, a slickline, or coiled tubing for positioning the well tool 114 in the wellbore 106. The well tool 114 can be conveyed into the wellbore 106 by manipulating the wireline, slickline, or coiled tubing using, for example, a guide or the winch 116. For example, if the wellbore operation is a drilling operation, the well tool 114 may be part of a drill string 120 for drilling the wellbore 106 and conveyed downhole during drilling operations. The well tool 114 additionally or alternatively can include various subsystems, such as a logging-while drilling (LWD) module, a measuring-while-drilling (MWD) module, a rotary steerable system, a motor, or any combination of these. At least one of the subsystems may measure properties of the rocks, fluid, or other contents of the subterranean formation 108.

Multiple pieces of well equipment, such as the physical well equipment 104a-b, can be positioned at the well surface 110 in the wellsite 100 or in the wellbore 106 for supporting the wellbore operation. The pieces of well equipment can each perform respective physical tasks, such as testing for a leak, pumping drilling fluid, adjusting an aperture of a choke valve, or the like. Examples of a piece of physical well equipment 104 may include surge tanks, transfer pumps, multi-phase flow meters, steam heat exchangers, air compressors, chemical injection pumps, solids collection systems, sand management systems, power generation systems, power distribution systems, water tanks, wireline or slickline units, drilling units, hydraulic workovers, chemical processing units, and distribution centers, pump trucks, coiled tubing units, choke manifolds, choke valves, or separators. The pieces of physical well equipment 104a-b can be equipped with sensor modules and communication interfaces, for example to allow the pieces of physical well equipment to perform distributed control decisions and other coordinated tasks. Although only two pieces of physical well equipment 104a-b are shown in FIG. 1, it will be appreciated that any number of pieces of well equipment can be positioned at the wellsite 100.

Each piece of physical well equipment can be a hydraulic device, mechanical device or an electromechanical device that is primarily designed to perform a respective physical task at the wellsite 100, though each piece of the physical well equipment can also include computing devices with processing capabilities for performing computerized tasks. In some examples, a piece of physical well equipment can include one or more control units, which can be software executed by a processor. For example, the wellsite 100 can include a first piece of well equipment 104a and a second piece of well equipment 104b. The first piece of well equipment 104a can be communicatively coupled to a first control unit 124a, while the second piece of well equipment 104b can be communicatively coupled to a second control unit 124b. In some examples, the first control unit 124a may be physically attached to the first piece of well equipment 104a or physically close thereto, for example if the first control unit 124a is located on the same skid as the first piece of well equipment 104a. Likewise, the second control unit 124b may be physically attached to the second piece of well equipment 104b or physically close thereto, for example if the second control unit 124b is located on the same skid as the second piece of well equipment 104b. The first control unit 124a and the second control unit 124b can be a part of the distributed control system 102 that enables implementation of the distributed control decisions.

In some examples, the first piece of well equipment 104a can perform a first physical task 122a, while the second piece of well equipment 104b can perform a second physical task 122b that is different from the first physical task 122a. The first control unit 124a can control the first physical task 122a for the first piece of well equipment 104a. For example, if the first physical task 122a is injecting drilling fluid into the wellbore 106, the first control unit 124a can control an injection rate for the drilling fluid. Similarly, the second control unit 124b can control the second physical task 122b for the second piece of well equipment 104b. If the distributed control system 102 detects that the second control unit 124b has failed or is disconnected, the distributed control system 102 can enable the first control unit 124a to take control of the second physical task 122b. As a result, the first control unit 124a coupled to the first piece of well equipment 104a can control the first physical task 122a for the first piece of well equipment 104a and the second physical task 122b for the second piece of well equipment 104b. Further details about the first control unit 124a and the second control unit 124b are described below with respect to FIG. 2.

Figure 2:
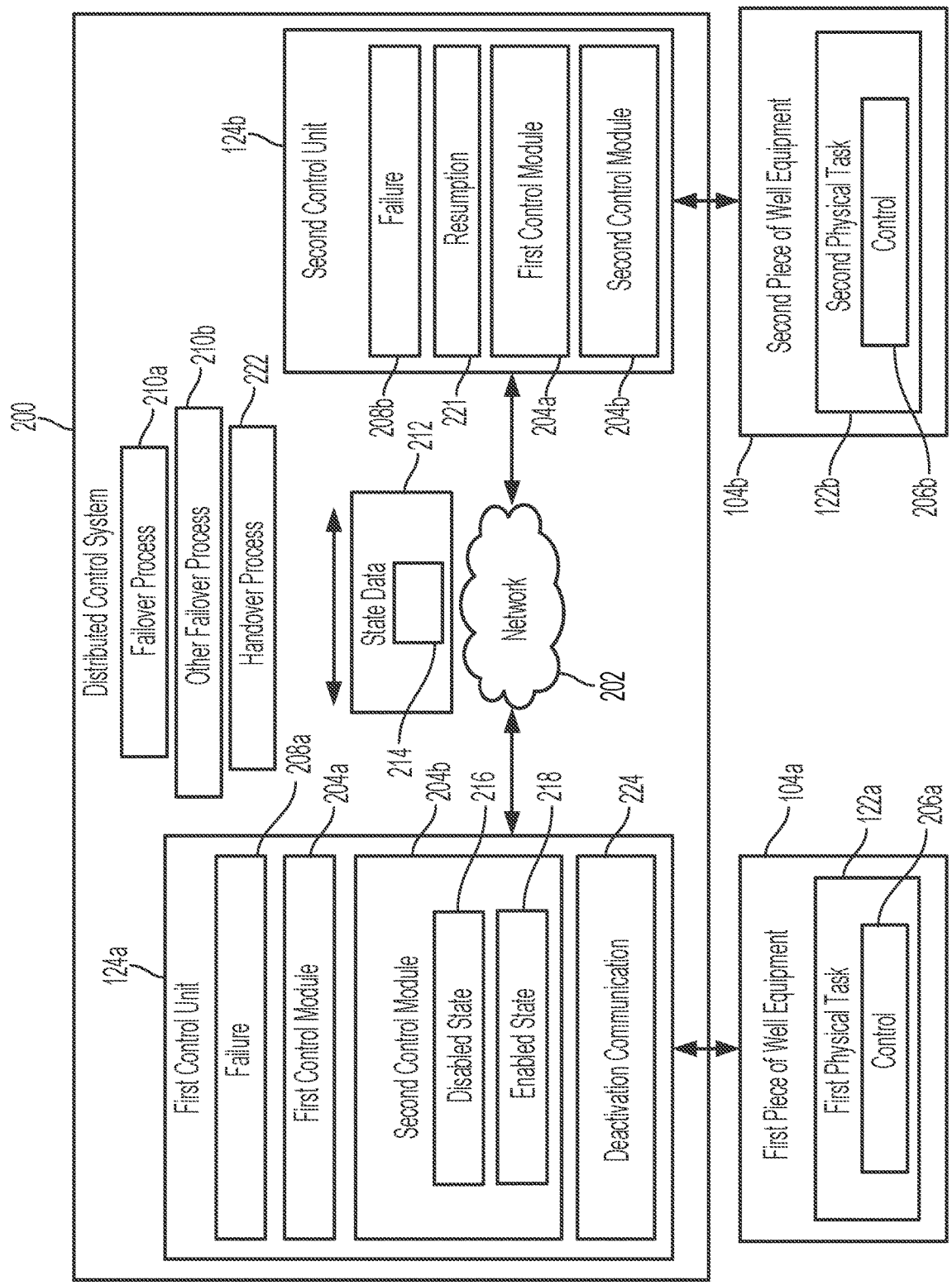
FIG. 2 is a block diagram of an example of a distributed control system with failover capabilities for physical well equipment according to some aspects of the present disclosure.

FIG. 2 is a block diagram of an example of a distributed control system 200 with failover capabilities for physical well equipment 104 according to some aspects of the present disclosure. As depicted in FIG. 2, the distributed control system 200 can include a first control unit 124a and a second control unit 124b that are communicatively coupled via a network 202. The control units 124a-b can include communications modules that control a wired interface or a wireless interface for intercommunication among the control units 124a-b. For example, the communications modules can transmit commands to a wireless interface for engaging in wireless communications. The wired interface or wireless interface can include one or more components that facilitate a network connection to the network 202, such as a local area network (LAN) or a wide area network (WAN). In some examples, the wireless interface may communicate via IEEE 802.11, Bluetooth, or radio interfaces for accessing cellular telephone networks (e.g., transceiver/antenna for accessing a CDMA, GSM, UMTS, or other mobile communications network). The wireless interface may alternatively use acoustic transmission, mud pulses, surface waves, vibrations, optical transmission, or induction (e.g., magnetic induction) for engaging in wireless communications. Examples of wired interfaces may include Ethernet, USB, IEEE 1394, or a fiber optic interface.

A first piece of well equipment 104a coupled to the first control unit 124a can perform a first physical task 122a, while a second piece of well equipment 104b coupled to the second control unit 124b can perform a second physical task 122b. Both the first control unit 124a and the second control unit 124b can include a first control module 204a that automatically controls the first physical task 122a and a second control module that automatically controls the second physical task 122b.

For example, the control modules 204a-b can control the physical tasks 122a-b by adjusting operation settings or state setpoints. The settings or setpoints may be adjusted based on system requirements set by an operator, predefined objectives, or other goals. In some examples, the second piece of well equipment 104b can communicate state data 212 to the first control unit 124a, thereby enabling the first control unit 124a to take over control 206b of the second physical task 122b if the second control unit 124b fails. For example, a failure 208a of the second control unit 124b can arise from the second control unit 124b disconnecting from the network 202 or another suitable issue that causes the second control unit 124b to be inoperative.

In addition to controlling the physical tasks 122a-b, the control modules 204a-b can handle other processes in the control units 124a-b, for example backing up data at a system level or at an individual level for each control unit. Accordingly, the control modules 204a-b may operate with a scope at the system level associated with the distributed control system 200 as a whole, at a local level associated with each control unit, or a combination of these. Besides communicating internally with other control units in the distributed control system 200, each control unit can enable external communication with other computing devices associated with a well operation related to the physical tasks 122a-b. To ensure connection security, the control units 124a-b may encrypt data before transferring or may encrypt a connection used to transmit the data.

If the distributed control system 200 detects that the second control unit 124b has failed (e.g., crashed), the distributed control system 200 can initiate a failover process 210a. To fulfill the failover process 210a, the first control unit 124a takes over control 206b of the second physical task 122b by enabling the second control module 204b on the first control unit 124a. For example, the second control module 204b in the first control unit 124a can use the state data 212 received from the second piece of well equipment 104b to control the second physical task 122b. The state data 212 can indicate one or more physical states 214 (e.g., flow rate, pressure, temperature, viscosity, etc.) of the second piece of well equipment 104b. The state data 212 may be collected using one or more sensors coupled to the second piece of well equipment 104b.

In some examples, the first control unit 124a can detect the failure 208a of the second control unit 124b, for example based on a notification received from the distributed control system 200 indicating that the failure 208a has occurred. After detecting the failure 208a of the second control unit 124b, the first control unit 124a can initiate the failover process 210a in which the second control module 204b of the first control unit 124a can be switched from a disabled state 216 to an enabled state 218. In some examples, a default state for the second control module 204b in the first control unit 124a may be the disabled state 216, enabling the second control module 204b in the second control unit 124b to have full control over the second physical task 122b.

In the enabled state 218, the second control module 204b in the first control unit 124a can automatically control a performance of the second physical task 122b for the second piece of well equipment 104b. The second control module 204b in the first control unit 124a may be different from a first control module 204a included in the first control unit 124a. For example, the first control module 204a can include control logic for automatically controlling the performance of the first physical task 122a by the first piece of well equipment 104a.

To switch the second control module 204b in the first control unit 124a to the enabled state 218, the first control unit 124a can cause the second control module 204b to access system data and local data (e.g., the state data 212) corresponding to the second piece of well equipment 104b. In some examples, the second control unit 124b may automatically upload the system data, the local data, or a combination of these to a database in the distributed control system 200 that is accessible by the first control unit 124a. For example, the database can be stored in a remote server that is communicatively coupled to the distributed control system 200. If the second control unit 124b fails, the first control unit 124a can obtain permission to access the database such that the second control module 204b in the first control unit 124a switches to the enabled state 218. In some examples, the network 202 connecting the control units 124a-b may include a reverse proxy or another suitable application to distribute data from the database to a suitable control unit. Additionally or alternatively, the first control unit 124a or the first piece of well equipment 104a may connect directly to the second piece of well equipment 104b to obtain the system data and the local data for allowing the first control unit 124a to control the second piece of well equipment 104b.

In some examples, the distributed control system 200 can detect the failure 208a of the first control unit 124a and automatically initiate another failover process 210b such that the second control unit 124b takes over control 206a of the first physical task 122a for the first piece of well equipment 104a. The other failover process 210b can involve enabling the first control module 204a on the second control unit 124b to control the first physical task 122a. For example, the first piece of well equipment 104a can communicate the state data 212 associated with the first piece of well equipment 104a to the second control unit 124b, thereby allowing the second control unit 124b to control the first physical task 122a upon the failure 208a of the first control unit 124a. In such examples, the state data 212 can indicate the one or more physical states 214 of the first piece of well equipment 104a. The state data 212 may be collected using one or more sensors coupled to the first piece of well equipment 104a.

If the distributed control system 200 detects a resumption 221 of the second control unit 124b, the distributed control system 200 can automatically initiate a handover process 222 through which the second control unit 124b retakes the control 206b of the second physical task 122b from the first control unit 124a. For example, if the second control unit 124b rejoins the distributed control system 200 by reconnecting to the network 202, the distributed control system 200 can disable the second control module 204b on the first control unit 124a. Disabling the second control module 204b can involve adjusting the enabled state 218 of the second control module 204b to the disabled state 216. Accordingly, the second control unit 124b can regain the control 206b of the second physical task 122b. The first control unit 124a can disable the second control module 204b in response to receiving a deactivation communication 224 from the distributed control system 200. The distributed control system 200 can automatically generate the deactivation communication 224 in response to detecting the resumption 221 of the second control unit 124b.

Figure 3:
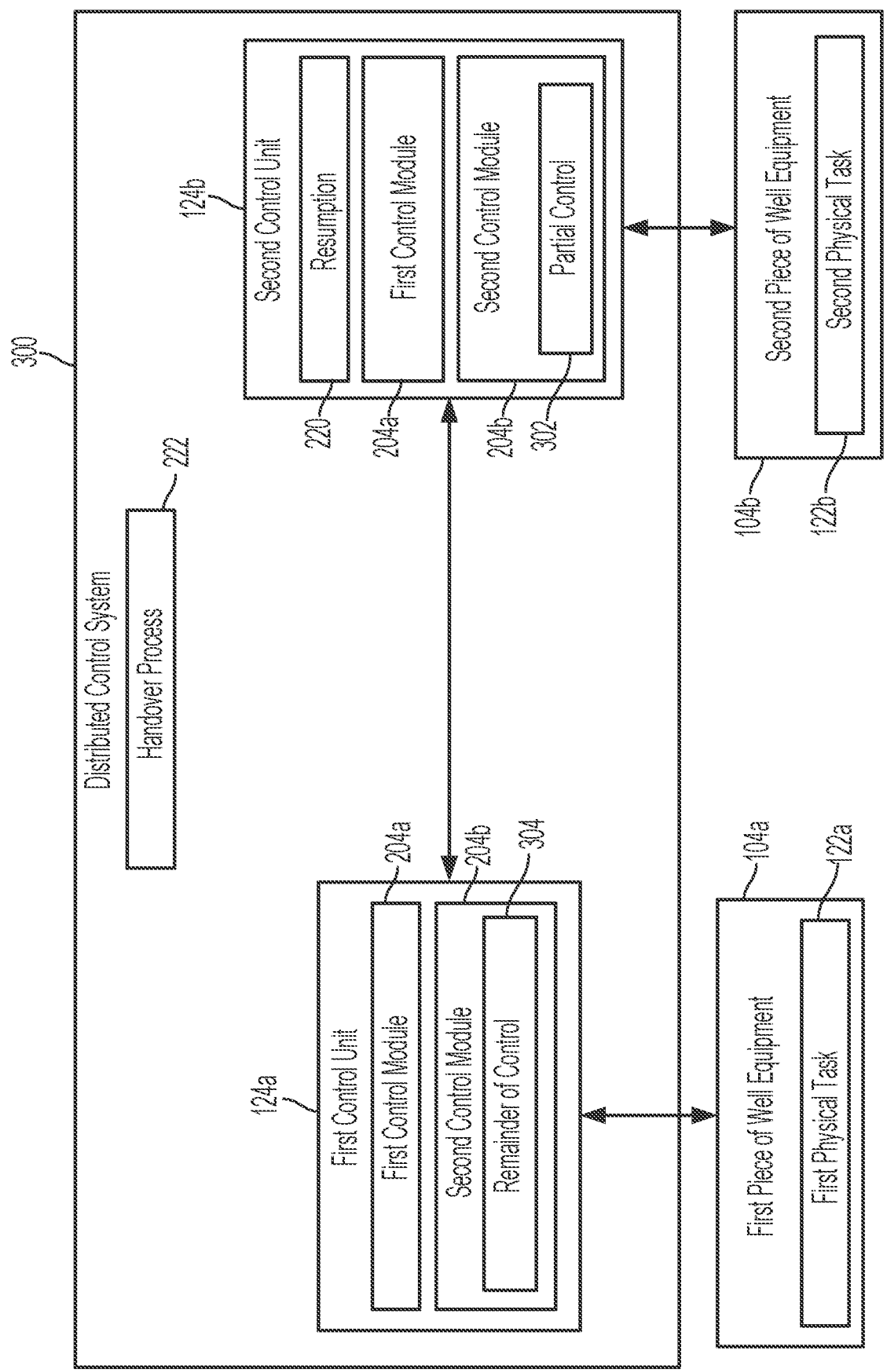
FIG. 3 is a block diagram of an example of a distributed control system implementing a handover process according to some aspects of the present disclosure.

In some examples, the second control unit 124b may retake only a portion of the control 206b associated with the second physical task 122b after it resumes operation. For example, as shown in FIG. 3, rather than regaining full control of the second physical task 122b through the handover process 222, the second control unit 124b can retake partial control 302 of the second physical task 122b. As a result, the second control module 204b in the first control unit 124a can remain enabled with a remainder of control 304 associated with the second physical task 122b. Accordingly, the second control module 204b in the first control unit 124a can share the control 206b of the second physical task 122b with the second control module 204b in the second control unit 124b.

Figure 4:
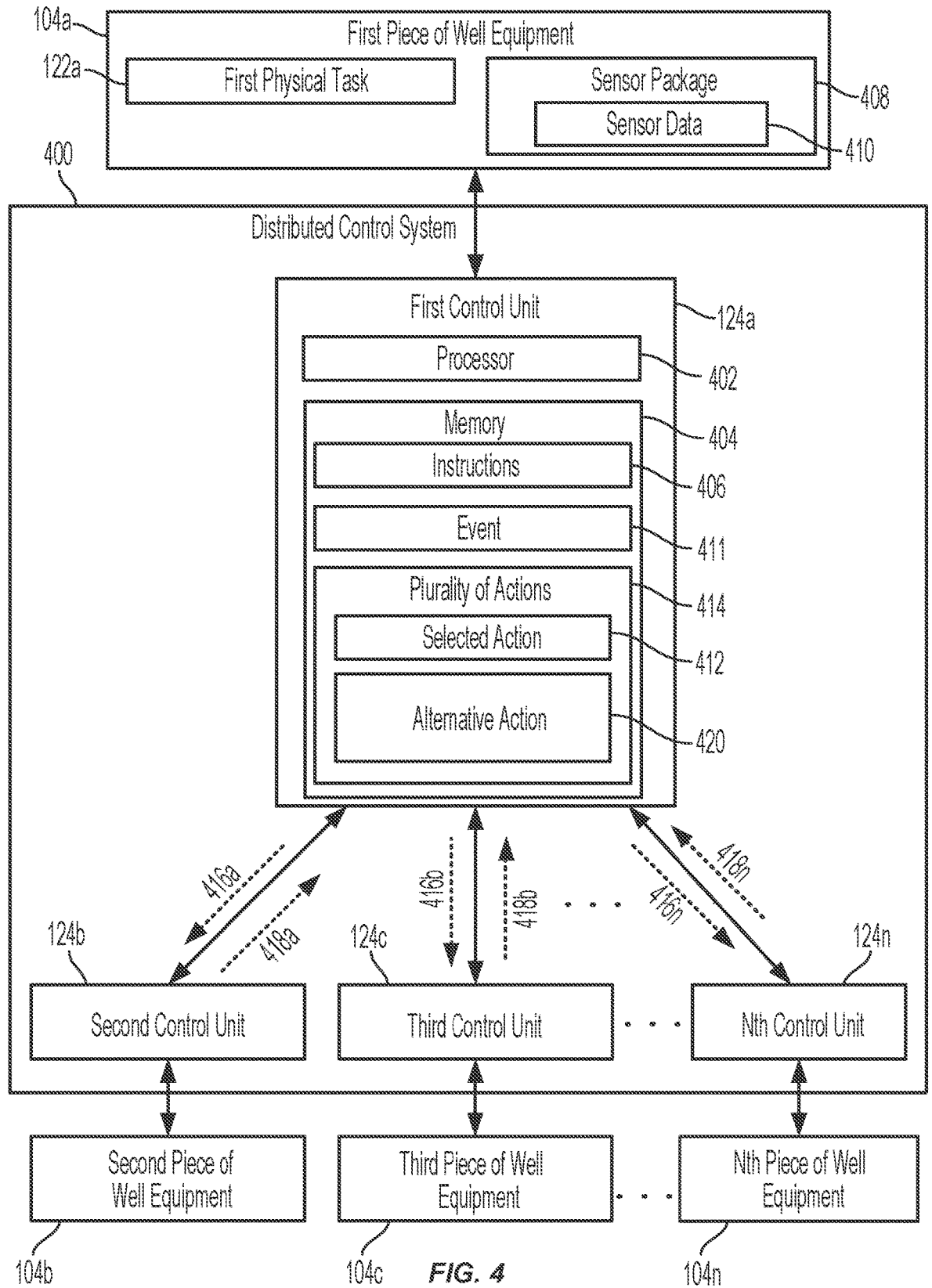
FIG. 4 is a block diagram of an example of a control unit interacting with other control units to determine an action to implement according to some aspects of the present disclosure.

FIG. 4 is a block diagram of a control unit 124a interacting with other control units 124b-n to determine an action to implement according to some aspects of the present disclosure. As shown, a first piece of well equipment 104a can be communicatively coupled to a first control unit 124a that includes a processor 402 communicatively coupled to a memory 404. The processor 402 is hardware that can include one processing device or multiple processing devices. Non-limiting examples of the processor 402 include a Field-Programmable Gate Array (FPGA), an application-specific integrated circuit (ASIC), or a microprocessor. The processor 402 can execute instructions 406 stored in the memory 404 to perform computing operations. The instructions 406 may include processor-specific instructions generated by a compiler or an interpreter from code written in any suitable computer-programming language, such as C, C++, C#, Python, or Java.

The memory 404 can include one memory device or multiple memory devices. The memory 404 can be volatile or can be non-volatile, such that it can retain stored information when powered off. Some examples of the memory 404 can include electrically erasable and programmable read-only memory (EEPROM), flash memory, or any other type of non-volatile memory. At least some of the memory 404 includes a non-transitory computer-readable medium from which the processor 402 can read instructions 406. A computer-readable medium can include electronic, optical, magnetic, or other storage devices capable of providing the processor 402 with computer-readable instructions or other program code. Some examples of a computer-readable medium include magnetic disks, memory chips, ROM, random-access memory (RAM), an ASIC, a configured processor, optical storage, or any other medium from which a computer processor can read the instructions 406.

The processor 402 can be in communication with a sensor package 408 coupled to the first piece of well equipment 104a. For example, the sensor package 408 can be positioned within the first piece of well equipment 104a, as depicted in FIG. 4. The sensor package 408 can include at least one sensor for collecting sensor data 410 associated with the physical states 214 of the first piece of well equipment 104a. Examples of such sensors can include a camera, a temperature sensor, an inclinometer, a pressure sensor, a force sensor, a conductivity sensor, a capacitance sensor, a level sensor, a resistivity sensor, a flow sensor, an accelerometer, a microphone, an accelerometer, a guided wave radar, or a radio frequency identification (RFID) reader. The sensor package 408 may collect the sensor data 410 in real time by taking a measurement at predetermined time intervals. Additionally or alternatively, the sensor package 408 can collect the sensor data 410 when commanded to, for example in response to receiving a command from the processor 402. As another example, in response to an event 411 being triggered, the sensor package 408 may collect the sensor data 410 such that the processor 402 can determine a suitable action. The sensor data 410 can be stored in the memory 404 of the first control unit 124a or another suitable storage system in the distributed control system 400. Each sensor of the sensor package 408 can be positioned at any suitable location on the first piece of well equipment 104a. For example, one or more sensors can be positioned at an inlet of the first piece of well equipment 104a, an outlet of the first piece of well equipment 104a, or a combination of these.

The processor 402 in the first control unit 124a can analyze the sensor data 410 to detect the event 411 associated with a first physical task 122a that is executed by the first piece of well equipment 104a. Based on the event 411, the first control unit 124a can select an action 412 to perform from among a plurality of actions 414. Determining the selected action 412 can involve workflows, heuristics, machine learning, physical models, statistical models, analytics on experimental data or historical data, or any combination of these. For example, the processor 402 can execute a machine-learning model that has been trained using historical data from one or more previous wellbore operations as an input to output the selected action 412. Additionally or alternatively, to determine the selected action 412, the processor 402 may execute at least one software model, such as an engineering model, that are based on the physical models, statistical models, or a combination of these. In some examples, the processor 402 can execute the software model to determine the selected action 412 based on a contribution of the selected action 412 to fulfilling a wellbore operation compared to other actions in the plurality of actions 414. For example, if the wellbore operation is a drilling operation, the software model may determine that increasing a circulation rate associated with downhole fluid may clean a wellbore 106 more quickly compared to adjusting a viscosity of the downhole fluid. As another example, if the wellbore operation is surface well testing, the software model may determine that adjusting a configuration fora choke manifold (e.g., a choke schedule) can increase a production rate more than implementing artificial lift.

After selecting the action 412 to perform, the first control module 204a may transmit a plurality of notifications 416a-n about the selected action 412 to the other control units 124b-n that form the distributed control system 400. In response, the first control module 204a can receive a plurality of responses 418a-n about the selected action 412 from the control units 124b-n. Each response in the responses 418a-n can be generated by a corresponding control unit and can provide an indication of whether to proceed with the selected action 412. For examples, the responses 418a-n can include a plurality of weights, such that each response of the responses 418a-n includes a respective weight to indicate a respective priority level of each response as determined by the corresponding control unit. Based on the responses 418a-n, the first control module 204a can determine whether to perform the selected action 412.

For example, the processor 402 may analyze pressure data from a choke valve to determine that upstream choke pressure is rising whereas downstream choke pressure is falling, indicating that debris may be plugging the choke valve. To clear the debris from the choke valve, the processor 402 may select an action involving rocking the choke valve by automatically increasing an orifice opening momentarily for the choke valve before resuming a previous orifice positioning. The processor 402 can then transmit the notifications 416a-n about the selected rocking action to the other control units 124b-n, such as a second control unit 124b communicatively coupled to a separator. The other control units 124b-n can receive the notifications 416a-n and transmit corresponding responses 418a-b. The responses 418a-n can indicate whether to rock the choke valve. Each of the other control units 124b-n can determine how to respond based on how the selected rocking action would impact its corresponding physical task and/or the progress of the well operation as a whole. For example, if the corresponding task of a third control unit 124c is maintaining stable flow, the third control unit 124c may respond to indicate that the selected rocking action would negatively impact the corresponding task. Because of the impact on its corresponding task, the third control unit 124c may include a high weight and a high priority level for its response to the first control unit 124a. Additionally or alternatively, each of the other control units 124b-n may respond to the notifications 416a-n based on respective state data for each of the other control units 124b-n. For example, the second control unit 124b can monitor an outlet flow from the separator and determine that a flow rate for the outlet flow is above a predefined threshold, indicating that the debris is unlikely to be plugging the choke valve. As a result, the second control unit 124b may generate a corresponding response with a low weight to indicate a low priority level associated with the selected rocking action.

Based on the respective weight or priority level of each response, the processor 402 may determine whether to perform the selected action 412 (e.g., rock the choke valve). If the processor 402 determines that there is consensus among the respective weight of each response, the first control unit 124a may proceed with the selected action 412. For example, if all other control units 124b-n assign a same respective weight in each response received by the first control unit 124a, the first control unit 124a can automatically perform the selected action 412. Alternatively, if one or more responses 418a-n conflict (e.g., if two responses have unequal weights), the first control unit 124a may determine whether to proceed with the selected action using a hierarchy for the control units 124b-n. In some examples, a location of the control units 124b-n can determine the hierarchy for the control units 124b-n. For example, if the second control unit 124b is located upstream from the third control unit 124c, the second control unit 124b may have greater control than the third control unit 124c. In this example, if a first response 418a from the second control unit 124b has a low weight whereas a second response 418b from the third control unit 124c has a high weight, the first control unit 124a may determine that the selected action 412 is not to be performed.

If the first control unit 124a determines that the selected action 412 is not to be performed based on the responses 418a-n, the first control unit 124a can select an alternative action 420 to perform. Determining the alternative action 420 similarly can involve workflows, heuristics, machine learning, physical models, statistical models, analytics on experimental data or historical data, or any combination of these. Additionally, the first control unit 124a may select the alternative action 420 based on the event 411, the responses 418a-n, or both of these. In some examples, when selecting the alternative action 420, the first control unit 124a can account for the respective weight or priority level of each response received from the other control units 124b-n. For example, the first control unit 124a can determine a subset of suitable actions from the actions 414 based on a suitable outcome or condition associated with the event 411. The first control unit 124a can then rank the subset of suitable actions using the respective weight of each response to select the alternative action 420 with a relatively high ranking.

After selecting the alternative action 420, the first control unit 124a can transmit another plurality of notifications about the alternative action 420 to the control units 124a-n. Similarly, the first control unit 124a can receive another plurality of responses about the alternative action 420 from the control units 124a-n. Each response in the other responses can provide an indication of whether to proceed with the alternative action 420. Based on the other responses, the first control unit 124a can determine whether to perform the alternative action 420. This process can iterate until the first control unit 124a identifies an allowable action. The first control unit 124a can then perform that action.

Although FIG. 4 shows a certain number and arrangement of components, this example is intended to be illustrative and non-limiting. Other examples may include more components, fewer components, different components, or a different arrangement of the components shown in FIG. 4. For instance, a sensor in the sensor package 408 may be positioned external to the first piece of well equipment 104a, though the sensor may still be used to monitor a parameter of the first piece of well equipment 104a. For instance, the sensor can be a camera that is remote from, and oriented facing, the first piece of well equipment 104a to capture images of the first piece of well equipment 104a. Any suitable arrangement of the depicted components is contemplated herein.

Figure 5:
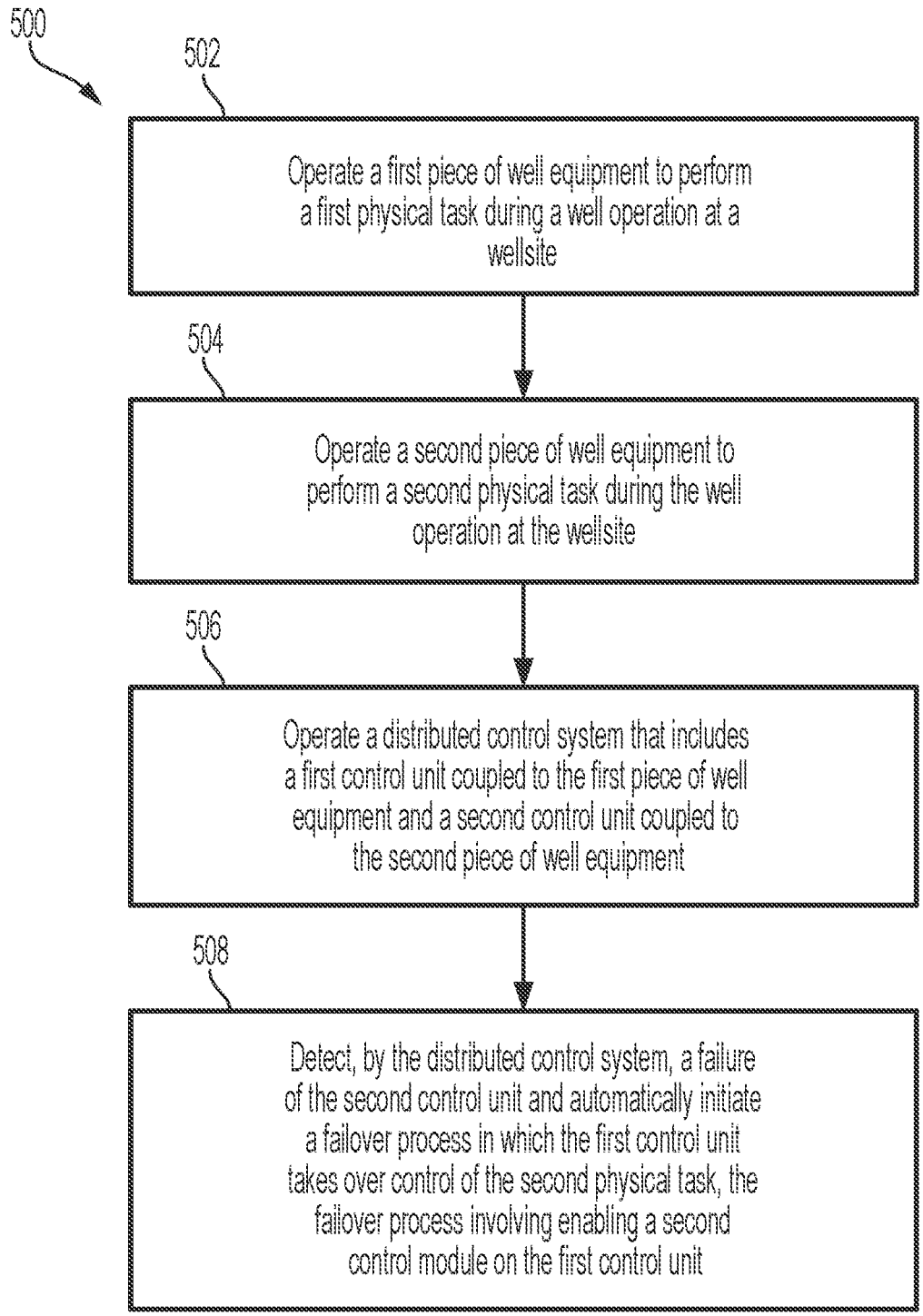
FIG. 5 is a flowchart of an example of a process for using a distributed control system to implement failover capabilities for physical well equipment according to some aspects of the present disclosure.

FIG. 5 is a flowchart of an example of a process 500 for using a distributed control system 200 to implement failover capabilities for physical well equipment 104 according to some aspects of the present disclosure. While FIG. 5 depicts a certain sequence of steps for illustrative purposes, other examples can involve more steps, fewer steps, different steps, or a different order of the steps depicted in FIG. 5. The steps of FIG. 5 are described below with reference to the components of FIGS. 1-2 described above.

In block 502, a well operator or system operates a first piece of well equipment 104a to perform a first physical task 122a during a well operation (e.g., a drilling operation or a well testing operation) at a wellsite 100. For example, if the well operation is a well testing operation, the first piece of well equipment 104a can be a choke manifold. Accordingly, the first physical task 122a can involve controlling flowback or treatment fluids using the first piece of well equipment 104a.

In block 504, the well operator or system operates a second piece of well equipment 104b to perform a second physical task 122b during the well operation at the wellsite 100. The second physical task 122b can be a different physical task than the first physical task 122a. For example, the second piece of well equipment 104b can be a separator associated with the choke manifold. The separator can separate a fluid flow at the wellsite 100 into one or more components (e.g., oil, gas, or water).

In block 506, the well operator or system operates the distributed control system 200 that includes a first control unit 124a coupled to the first piece of well equipment 104a and a second control unit 124b coupled to the second piece of well equipment 104b. The first control unit 124a and the second control unit 124b can include a first control module 204a to automatically control the first physical task 122a and a second control module 204b to automatically control the second physical task 122b. For example, the first control unit 124a can control a choke bean position (or aperture size) associated with the choke manifold to adjust choke pressure. The second control unit 124b can control the separator, for example by adjusting a physical condition (e.g., flow rate, temperature, or pressure) of the fluid flow to separate a specific component from the fluid flow.

In block 508, the distributed control system 200 detects a failure 208a of the second control unit 124b. In response to detecting the failure 208a, the distributed control system 200 can automatically initiate a failover process 210a in which the first control unit 124a takes over control 206b of the second physical task 122b. For example, the distributed control system 200 can transmit a notification to the first control unit 124a indicating that the second control unit 124b has failed, which can trigger the failover process 210a. The failover process 210a can involve enabling the second control module 204b on the first control unit 124a.

Prior to failure, the second control unit 124b may have communicated state data 212 associated with one or more physical states 214 of the second piece of well equipment 104b to the first control unit 124a. For example, the second control unit 124b can transmit the state data 212 to an intermediary storage device (e.g., a central database) that is accessible to the first control unit 124a, so that the first control unit 124a can access the state data 212 from the intermediary storage device. This can allow the first control unit 124a to control the second physical task 122b after the second control unit 124b fails. For example, the second control unit 124b may have previously transmitted pressure data to the first control unit 124a. Following a failure of the second control unit 124b, the first control unit 124a can then use that pressure data to determine how to adjust one or more suitable physical conditions of the second piece of well equipment 104b, for example to separate the fluid flow.

In some examples, the first control unit 124a additionally or alternatively may receive the state data 212 from the second piece of well equipment 104b. Receiving the state data 212 from the second piece of well equipment 104b can cause a second control module 204b of the first control unit 124a to switch from a disabled state 216 to an enabled state 218. The second control module 204b in the first control unit 124a can automatically control performance of the second physical task 122b for the second piece of well equipment 104b. Contemporaneously, a first control module 204a in the first control unit 124a can continue automatically controlling the performance of the first physical task 122a by the first piece of well equipment 104a.

Figure 6:
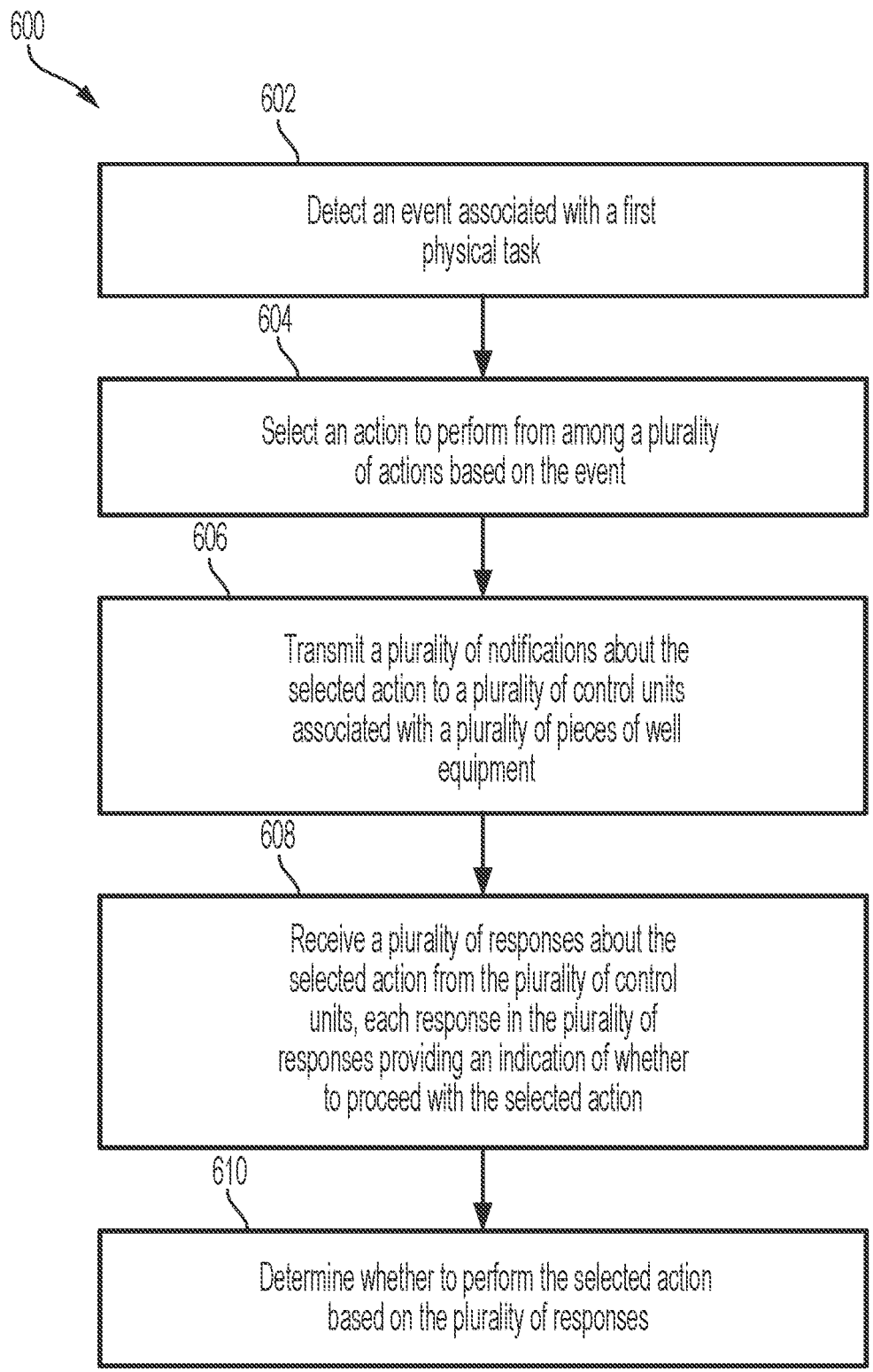
FIG. 6 is a flowchart of an example of a process for determining an action to perform by a control unit according to some aspects of the present disclosure.

FIG. 6 is a flowchart of a process 600 for selecting an action 412 to implement by a control unit according to some aspects of the present disclosure. While FIG. 6 depicts a certain sequence of steps for illustrative purposes, other examples can involve more steps, fewer steps, different steps, or a different order of the steps depicted in FIG. 6. The steps of FIG. 6 are described below with reference to the components of FIGS. 1, 2, and 4 described above.

In block 602, a first control unit 124a detects an event 411 associated with a first physical task 122a by analyzing sensor data 410 from a sensor package 408 coupled to a first piece of well equipment 104a. Examples of the sensor data 410 can include density data, viscosity data, impedance data, flow rate data, vibrational data, or other suitable wellsite equipment data. The first control unit 124a can detect the event 411 by determining that at least one subset of the sensor data 410 has exceeded a predefined threshold that indicates an increased likelihood of a hazard or a suboptimal condition. For example, if the first control unit 124a is coupled to a shale shaker, the first control unit 124a can detect an increased likelihood of packoff occurring downhole due to a decrease in cuttings content from a drilling fluid processed by the shale shaker. The shale shaker can include a scale in a corresponding sensor package to obtain mass measurements associated with the cuttings content being separated from the drilling fluid. Fewer cuttings being removed by the shale shaker can indicate that a relatively high amount of cuttings are remaining downhole instead of being conveyed to a well surface 110 by the drilling fluid.

Additionally or alternatively, the first control unit 124a may detect the event 411 using data (e.g., the sensor data 410 or state data 212) associated with one or more other pieces of well equipment 104b-n. For example, the first control unit 124a may receive another set of sensor data from a second control unit 124b coupled to a second piece of well equipment 104b. Based on the other set of sensor data, the first control unit 124a can identify the hazard or the suboptimal condition. In response, the first control unit 124a can automatically make adjustments to settings of the first piece of well equipment 104a to avoid or mitigate the hazard or the suboptimal condition. In some examples, the event 411 can include handling key system variables (e.g., explosives, radioactive material, or other hazards) to ensure consistency across multiple control units. If a certain control unit fails, ensuring consistency with respect to the key system variables can enable another control unit to take over control for any physical tasks controlled by the certain control unit.

As an illustrative example, if the second control unit 124b is coupled to a mud tank, the first control unit 124a may receive the other set of sensor data indicating that a solids content for a drilling fluid is above the predefined threshold. In response, the first control unit 124a may execute protocol to pinpoint a cause of the suboptimal solids content for the shale shaker coupled to the first control unit 124a. If first control unit 124a determines the cause of the suboptimal solids content, the first control unit 124a may automatically adjust the settings of the shale shaker to mitigate the suboptimal solids content, for example by adjusting a vibration rate. Alternatively, if the first control unit 124a determines that the suboptimal solids content is unrelated to the shale shaker, the first control unit 124a may notify the second control unit 124b such that the second control unit 124b may communicate with the other control units 124c-n to determine the cause of the suboptimal solids content. In this way, communication among the control units 124a-n can enable cooperation in determining the cause of the suboptimal condition, allowing for relatively efficient troubleshooting. Furthermore, the communication among the control units 124a-n may enable the control units 124a-n to resolve a suboptimal condition that may otherwise be irresolvable by an individual control unit.

In block 604, the first control unit 124a selects an action 412 to perform from among a plurality of actions 414 based on the event 411. In some examples, the first control unit 124a may determine the selected action 412 using a contribution of the selected action 412 to the event 411. For example, each action of the actions 414 may have a positive contribution, a negative contribution, or a neutral contribution to the event 411. Based on a suitable outcome or contribution to the event 411, the first control unit 124a can determine the selected action 412. As an illustrative example, if the event 411 involves handling flammable compounds, the plurality of actions 414 may include neutralizing the flammable compounds, isolating the flammable compounds, or increasing a temperature associated with the flammable compounds. In one example, the first control unit 124a may select to neutralize the flammable compounds based on the sensor data 410 indicating that a concentration of the flammable compounds is approaching a predetermined threshold. For example, the concentration of the flammable compounds being above the predetermined threshold may indicate that an explosion is relatively likely to occur. The suitable outcome can be to prevent the explosion from occurring, thereby causing the first control unit 124a to determine the selected action 412 as neutralizing the flammable compounds.

In block 606, the first control unit 124a transmits a plurality of notifications 416a-n about the selected action 412 to a plurality of other control units 124b-n associated with a plurality of pieces of well equipment 104a-n. The control units 124b-n can form the distributed control system 400. For example, the first control unit 124a can transmit a first notification 416a to the second control unit 124b about neutralizing the flammable compounds. Similarly, the first control unit 124a may transmit a second notification 416b to a third control unit 124c about neutralizing the flammable compounds.

In block 608, the first control unit 124a receives a plurality of responses 418a-n about the selected action 412 from the other control units 124b-n. Each of the responses 418a-n can be transmitted by a corresponding control unit and can provide an indication of whether to proceed with the selected action 412. For example, the responses 418a-n can include a plurality of weights such that each response of the responses 418a-n includes a respective weight indicating a respective priority level of each response. Additionally or alternatively, the responses 418a-n may include state data 212 corresponding to a respective control unit of the other control units 124b-n. Based on the weights of the responses 418a-n, first control unit 124a can determine whether to perform the selected action 412.

For example, the first control unit 124a may control a first piece of well equipment 104a with low contact with the flammable compounds. Accordingly, the first control unit 124a may transmit a first response 418a indicating to not proceed with the selected action 412 of neutralizing the flammable compounds. Because the first piece of well equipment 104a has low contact with the flammable compounds, the first control unit 124a may assign a low weight indicating a low priority level as the respective weight and the respective priority level for the first response 418a. Contrary to the first control unit 124a, the second control unit 124b may control a second piece of well equipment 104b with high contact with the flammable compounds. As a result, a second response 418b transmitted by the second control unit 124b to the first control unit 124a may indicate to proceed with the selected action 412. Additionally, the second response 418b may include a high weight to indicate a high priority level as the respective weight and the respective priority level.

In some examples, the responses 418a-n from the other control units 124b-n additionally can provide information (e.g., the state data 212) to the first control unit 124a such that the first control unit 124a can determine the key system variables are matching across the other control units 124b-n. For example, if a first radiation level detected by the second control unit 124b is higher than a second radiation level detected by the first control unit 124a, the first control unit 124a may transmit a corresponding notification to the second control unit 124b. The corresponding notification may indicate an adjustment to be implemented by the second control unit 124b to lower the first radiation level. Additionally or alternatively, the process 600 may return to block 604 with the second radiation level being the event 411 to be addressed by the first control unit 124a selecting the action 412 and determining whether to perform the selected action 412.

In some examples, the first control unit 124a may not receive responses from all of the other control units 124b-n. For instance, the first control unit 124a may only receive one response from one other control unit 124b. In that situation, the first control unit 124a may make a decision based on the responses that it does receive. And, in some examples, the first control unit 124a may not receive any responses at all from the other control units 124b-n. In that situation, the first control unit 124a may make a decision on its own without the input of the other control units 124b-n.

In block 610, the first control unit 124a determines whether to perform the selected action 412 based on the responses 418a-n. The respective weight or respective priority level assigned to the responses 418a-n by the other control units 124b-n may influence whether the first control unit 124a performs the selected action 412. For example, based on a second response 418b indicating the high priority level for the selected action 412, the first control unit 124a may neutralize the flammable compounds to minimize a likelihood of the explosion occurring.

If the first control unit 124a determines that the selected action 412 is not to be performed based on the responses 418a-n, the first control unit 124a can select an alternative action 420 to perform based on the event 411 or the responses 418a-n. For example, a relative majority of the responses 418a-n may assign a low priority level to the selected action 412, causing the first control unit 124a to determine that the selected action 412 is not to be performed. The process 600 can then return to block 602 and the process 600 can iterate.

For example, the first control unit 124a may select an alternative action 420 that involves isolating the flammable compounds such that the second piece of well equipment 104b may have relatively low contact with the flammable compounds. As a result, the likelihood of the explosion occurring can be mitigated. To determine whether to perform the alternative action 420, the first control unit 124a can transmit other notifications about the alternative action 420 to the control units 124a-n associated with the pieces of well equipment 104a-n. In response to the other notifications, the pieces of well equipment 104a-n can transmit other responses about the alternative action 420 to the control units 124a-n, where each response provides an indication of whether to proceed with the alternative action 420. The first control unit 124a can then act accordingly based on the other responses.

In some aspects, a system, a method, and a non-transitory computer-readable medium for using a distributed control system to implement failover capabilities for physical well equipment are provided according to one or more of the following examples. As used below, any reference to a series of examples is to be understood as a reference to each of those examples disjunctively (e.g., "Examples 1-4" is to be understood as "Examples 1, 2, 3, or 4").

Example 1 is a system comprising: a first piece of well equipment configured to perform a first physical task during a well operation at a wellsite; a second piece of well equipment configured to perform a second physical task during the well operation at the wellsite; and a distributed control system that includes a first control unit coupled to the first piece of well equipment and a second control unit coupled to the second piece of well equipment, wherein the first control unit and the second control unit both include a first control module configured to automatically control the first physical task and a second control module configured to automatically control the second physical task, wherein the distributed control system is configured to detect a failure of the second control unit and automatically initiate a failover process in which the first control unit takes over control of the second physical task, the failover process involving enabling the second control module on the first control unit.

Example 2 is the system of example(s) 1, wherein the second piece of well equipment is configured to communicate state data to the first control unit for enabling the first control unit to take over control of the second physical task upon a failure of the second control unit, the state data indicating one or more physical states of the second piece of well equipment.

Example 3 is the system of example(s) 1-2, wherein the distributed control system is further configured to detect a failure of the first control unit and automatically initiate another failover process in which the second control unit takes over control of the first physical task, the other failover process involving enabling the first control module on the second control unit.

Example 4 is the system of example(s) 1-3, wherein the first piece of well equipment is configured to communicate state data to the second control unit for enabling the second control unit to take over control of the first physical task upon a failure of the first control unit, the state data indicating one or more physical states of the first piece of well equipment.

Example 5 is the system of example(s) 1-4, wherein the first control unit is configured to: detect an event associated with the first physical task by analyzing sensor data from a sensor package coupled to the first piece of well equipment; select an action to perform from among a plurality of actions based on the event; transmit a plurality of notifications about the selected action to a plurality of control units associated with a plurality of pieces of well equipment, the plurality of control units forming the distributed control system; receive a plurality of responses about the selected action from the plurality of control units, each response in the plurality of responses providing an indication of whether to proceed with the selected action; and determine whether to perform the selected action based on the plurality of responses.

Example 6 is the system of example(s) 1-5, wherein the first control unit is configured to: determine that the selected action is not to be performed based on the plurality of responses; in response to determining that the selected action is not to be performed based on the plurality of responses, select an alternative action to perform based on the event or the plurality of responses; transmit another plurality of notifications about the alternative action to the plurality of control units associated with the plurality of pieces of well equipment; receive another plurality of responses about the alternative action from the plurality of control units, each response in the other plurality of responses providing an indication of whether to proceed with the alternative action; and determine whether to perform the alternative action based on the other plurality of responses.

Example 7 is the system of example(s) 1-6, wherein the plurality of responses includes a plurality of weights, each response of the plurality of responses being transmitted by a corresponding control unit and including a respective weight indicating a respective priority level of the response as determined by the corresponding control unit, and wherein the first control module is configured to determine whether to perform the selected action based on the plurality of weights in the plurality of responses.

Example 8 is the system of example(s) 1-7, wherein the distributed control system is configured to detect a resumption of the second control unit and automatically initiate a handover process in which the second control unit retakes control of the second physical task from the first control unit, the handover process involving disabling the second control module on the first control unit.

Example 9 is the system of example(s) 1-8, wherein the distributed control system is configured to disable the second control module on the first control unit by transmitting a deactivation communication to the first control unit, the first control unit being configured to receive the deactivation communication and responsively disable the second control module.

Example 10 is a method comprising: operating a first piece of well equipment to perform a first physical task during a well operation at a wellsite; operating a second piece of well equipment to perform a second physical task during the well operation at the wellsite; operating a distributed control system that includes a first control unit coupled to the first piece of well equipment and a second control unit coupled to the second piece of well equipment, wherein the first control unit includes a first control module configured to automatically control the first physical task and a second control module configured to automatically control the second physical task; and detecting, by the distributed control system, a failure of the second control unit and automatically initiating a failover process in which the first control unit takes over control of the second physical task, the failover process involving enabling the second control module on the first control unit.

Example 11 is the method of example(s) 10, wherein the second piece of well equipment is configured to communicate state data to the first control unit for enabling the first control unit to take over control of the second physical task upon a failure of the second control unit, the state data indicating one or more physical states of the second piece of well equipment.

Example 12 is the method of example(s) 10-11, wherein the second control unit also includes the first control module, and wherein the distributed control system is further configured to detect a failure of the first control unit and automatically initiate another failover process in which the second control unit takes over control of the first physical task, the other failover process involving enabling the first control module on the second control unit.

Example 13 is the method of example(s) 10-12, wherein the first piece of well equipment is configured to communicate state data to the second control unit for enabling the second control unit to take over control of the first physical task upon a failure of the first control unit, the state data indicating one or more physical states of the first piece of well equipment.

Example 14 is the method of example(s) 10-13, wherein the first control unit is configured to: detect an event associated with the first physical task; select an action to perform from among a plurality of actions based on the event; transmit a plurality of notifications about the selected action to a plurality of control units associated with a plurality of pieces of well equipment; receive a plurality of responses about the selected action from the plurality of control units, each response in the plurality of responses providing an indication of whether to proceed with the selected action; and determine whether to perform the selected action based on the plurality of responses.

Example 15 is the method of example(s) 10-14, wherein the first control unit is configured to: determine that the selected action is not to be performed based on the plurality of responses; in response to determining that the selected action is not to be performed based on the plurality of responses, select an alternative action to perform based on the event or the plurality of responses; transmit another plurality of notifications about the alternative action to the plurality of control units associated with the plurality of pieces of well equipment; receive another plurality of responses about the alternative action from the plurality of control units, each response in the other plurality of responses providing an indication of whether to proceed with the alternative action; and determine whether to perform the alternative action based on the other plurality of responses.

Example 16 is the method of example(s) 10-15, wherein the plurality of responses include a plurality of weights, each response of the plurality of responses being transmitted by a corresponding control unit and including a respective weight indicating a respective priority level of the response as determined by the corresponding control unit, and wherein the first control module is configured to determine whether to perform the selected action based on the plurality of weights in the plurality of responses.

Example 17 is the method of example(s) 10-16, wherein the distributed control system is configured to detect a resumption of the second control unit and automatically initiate a handover process in which the second control unit resumes partial control of the second physical task, wherein a remainder of the control over the second physical task remains with the first control unit.

Example 18 is the method of example(s) 10-17, wherein the distributed control system is configured to disable the second control module on the first control unit by transmitting a deactivation communication to the first control unit, the first control unit being configured to receive the deactivation communication and responsively disable the second control module.

Example 19 is a non-transitory computer-readable medium comprising program code that is executable by a processor of a first control unit coupled to a first piece of well equipment, the program code being executable by the processor for causing the first control unit to: detect a failure of a second control unit that is coupled to a second piece of well equipment configured to perform a second physical task during a well operation at a wellsite, the second physical task being different from a first physical task performable by the first piece of well equipment during the well operation; and in response to detecting the failure, initiate a failover process in which the first control unit takes over control of the second physical task, the failover process involving switching a second control module of the first control unit from a disabled state to an enabled state, the second control module being usable in the enabled state to automatically control performance of the second physical task, and the second control module being different from a first control module included in the first control unit for automatically controlling performance of the first physical task by the first piece of well equipment.

Example 20 is the non-transitory computer-readable medium of example(s) 19, further comprising program code that is executable by the processor for causing the first control unit to: detect an event associated with the first physical task; select an action to perform from among a plurality of actions based on the event; transmit a plurality of notifications about the selected action to a plurality of control units associated with a plurality of pieces of well equipment, the plurality of control units including the second control unit; receive a plurality of responses about the selected action from the plurality of control units, each response in the plurality of responses providing an indication of whether to proceed with the selected action; and determine whether to perform the selected action based on the plurality of responses.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a first piece of well equipment configured to perform a first physical task during a well operation at a wellsite;
   a second piece of well equipment configured to perform a second physical task during the well operation at the wellsite; and
   a distributed control system that includes a first control unit coupled to the first piece of well equipment and a second control unit coupled to the second piece of well equipment, wherein the first control unit and the second control unit both include a first control module configured to automatically control the first physical task and a second control module configured to automatically control the second physical task, wherein the first control unit is configured to determine an action to perform at least in part by communicating with the second control unit, wherein the first control unit is configured to determine whether to perform the action by transmitting a request to the second control unit for an approval of the action, wherein the distributed control system is configured to detect a failure of the second control unit and automatically initiate a failover process in which the first control unit takes over control of the second physical task, the failover process involving enabling the second control module on the first control unit.

2. The system of claim 1, wherein the second piece of well equipment is configured to communicate state data to the first control unit for enabling the first control unit to take over control of the second physical task upon a failure of the second control unit, the state data indicating one or more physical states of the second piece of well equipment.

3. The system of claim 1, wherein the distributed control system is further configured to detect a failure of the first control unit and automatically initiate another failover process in which the second control unit takes over control of the first physical task, the other failover process involving enabling the first control module on the second control unit.

4. The system of claim 3, wherein the first piece of well equipment is configured to communicate state data to the second control unit for enabling the second control unit to take over control of the first physical task upon a failure of the first control unit, the state data indicating one or more physical states of the first piece of well equipment.

5. The system of claim 1, wherein the first control unit is configured to determine the action to perform by:
   detecting an event associated with the first physical task by analyzing sensor data from a sensor package coupled to the first piece of well equipment;
   selecting the action to perform from among a plurality of actions based on the event;
   transmitting a plurality of notifications about the selected action to a plurality of control units associated with a plurality of pieces of well equipment, the plurality of control units forming the distributed control system;
   receiving a plurality of responses about the selected action from the plurality of control units, each response in the plurality of responses providing an indication of whether to proceed with the selected action; and
   determining whether to perform the selected action based on the plurality of responses.

6. The system of claim 5, wherein the first control unit is configured to:
   determine that the selected action is not to be performed based on the plurality of responses;
   in response to determining that the selected action is not to be performed based on the plurality of responses, select an alternative action to perform based on the event or the plurality of responses;
   transmit another plurality of notifications about the alternative action to the plurality of control units associated with the plurality of pieces of well equipment;
   receive another plurality of responses about the alternative action from the plurality of control units, each response in the other plurality of responses providing an indication of whether to proceed with the alternative action; and
   determine whether to perform the alternative action based on the other plurality of responses.

7. The system of claim 5, wherein the plurality of responses includes a plurality of weights, each response of the plurality of responses being transmitted by a corresponding control unit and including a respective weight indicating a respective priority level of the response as determined by the corresponding control unit, and wherein the first control module is configured to determine whether to perform the selected action based on the plurality of weights in the plurality of responses.

8. The system of claim 1, wherein the distributed control system is configured to detect a resumption of the second control unit and automatically initiate a handover process in which the second control unit retakes control of the second physical task from the first control unit, the handover process involving disabling the second control module on the first control unit.

9. The system of claim 8, wherein the distributed control system is configured to disable the second control module on the first control unit by transmitting a deactivation communication to the first control unit, the first control unit being configured to receive the deactivation communication and responsively disable the second control module.

10. A method comprising:
   operating a first piece of well equipment to perform a first physical task during a well operation at a wellsite;
   operating a second piece of well equipment to perform a second physical task during the well operation at the wellsite;
   operating a distributed control system that includes a first control unit coupled to the first piece of well equipment and a second control unit coupled to the second piece of well equipment, wherein the first control unit includes a first control module configured to automatically control the first physical task and a second control module configured to automatically control the second physical task; and
   detecting, by the distributed control system, a failure of the second control unit and automatically initiating a failover process in which the first control unit takes over control of the second physical task, the failover process involving enabling the second control module on the first control unit, wherein the distributed control system is configured to detect a resumption of the second control unit and automatically initiate a handover process in which the second control unit resumes partial control of the second physical task, wherein a remainder of the control over the second physical task remains with the first control unit.

11. The method of claim 10, wherein the second piece of well equipment is configured to communicate state data to the first control unit for enabling the first control unit to take over control of the second physical task upon a failure of the second control unit, the state data indicating one or more physical states of the second piece of well equipment.

12. The method of claim 10, wherein the second control unit also includes the first control module, and wherein the distributed control system is further configured to detect a failure of the first control unit and automatically initiate another failover process in which the second control unit takes over control of the first physical task, the other failover process involving enabling the first control module on the second control unit.

13. The method of claim 12, wherein the first piece of well equipment is configured to communicate state data to the second control unit for enabling the second control unit to take over control of the first physical task upon a failure of the first control unit, the state data indicating one or more physical states of the first piece of well equipment.

14. The method of claim 10, wherein the first control unit is configured to:
  detect an event associated with the first physical task;
  select an action to perform from among a plurality of actions based on the event;
  transmit a plurality of notifications about the selected action to a plurality of control units associated with a plurality of pieces of well equipment;
  receive a plurality of responses about the selected action from the plurality of control units, each response in the plurality of responses providing an indication of whether to proceed with the selected action; and
  determine whether to perform the selected action based on the plurality of responses.

15. The method of claim 14, wherein the first control unit is configured to:
  determine that the selected action is not to be performed based on the plurality of responses;
  in response to determining that the selected action is not to be performed based on the plurality of responses, select an alternative action to perform based on the event or the plurality of responses;
  transmit another plurality of notifications about the alternative action to the plurality of control units associated with the plurality of pieces of well equipment;
  receive another plurality of responses about the alternative action from the plurality of control units, each response in the other plurality of responses providing an indication of whether to proceed with the alternative action; and
  determine whether to perform the alternative action based on the other plurality of responses.

16. The method of claim 14, wherein the plurality of responses include a plurality of weights, each response of the plurality of responses being transmitted by a corresponding control unit and including a respective weight indicating a respective priority level of the response as determined by the corresponding control unit, and wherein the first control module is configured to determine whether to perform the selected action based on the plurality of weights in the plurality of responses.

17. The method of claim 10, wherein the distributed control system is configured to disable the second control module on the first control unit by transmitting a deactivation communication to the first control unit, the first control unit being configured to receive the deactivation communication and responsively disable the second control module.

18. A non-transitory computer-readable medium comprising program code that is executable by a processor of a first control unit coupled to a first piece of well equipment, the program code being executable by the processor for causing the first control unit to:
  detect an event associated with a first physical task performable by the first piece of well equipment during a well operation at a wellsite;
  select an action to perform from among a plurality of actions based on the event;
  transmit a plurality of notifications about the selected action to a plurality of control units associated with a plurality of pieces of well equipment that includes a second piece of well equipment, the plurality of control units including a second control unit;
  receive a plurality of responses about the selected action from the plurality of control units, each response in the plurality of responses providing an indication of whether to proceed with the selected action;
  determine whether to perform the selected action based on the plurality of responses;
  detect a failure of the second control unit that is coupled to the second piece of well equipment configured to perform a second physical task during the well operation, the second physical task being different from the first physical task; and
  in response to detecting the failure, initiate a failover process in which the first control unit takes over control of the second physical task, the failover process involving switching a second control module of the first control unit from a disabled state to an enabled state, the second control module being usable in the enabled state to automatically control performance of the second physical task, and the second control module being different from a first control module included in the first control unit for automatically controlling performance of the first physical task by the first piece of well equipment.

19. The non-transitory computer-readable medium of claim 18, wherein the second piece of well equipment is configured to communicate state data to the first control unit for enabling the first control unit to take over control of the second physical task upon a failure of the second control unit, the state data indicating one or more physical states of the second piece of well equipment.

20. The non-transitory computer-readable medium of claim 18, wherein the first control unit is configured to:
  determine that the selected action is not to be performed based on the plurality of responses;
  in response to determining that the selected action is not to be performed based on the plurality of responses, select an alternative action to perform based on the event or the plurality of responses;
  transmit another plurality of notifications about the alternative action to the plurality of control units associated with the plurality of pieces of well equipment;
  receive another plurality of responses about the alternative action from the plurality of control units, each response in the other plurality of responses providing an indication of whether to proceed with the alternative action; and
  determine whether to perform the alternative action based on the other plurality of responses.

* * * * *